Dec. 23, 1930.  R. F. HUDSON  1,786,207
MACHINE GUN
Filed Dec. 12, 1927     5 Sheets-Sheet 1

Inventor
Robert F. Hudson

Attorney

Dec. 23, 1930.  R. F. HUDSON  1,786,207
MACHINE GUN
Filed Dec. 12, 1927  5 Sheets-Sheet 2

Inventor
Robert F. Hudson
By
Attorney

Dec. 23, 1930.   R. F. HUDSON   1,786,207
MACHINE GUN
Filed Dec. 12, 1927   5 Sheets-Sheet 3

Inventor
Robert F. Hudson
By
Attorney

Dec. 23, 1930. R. F. HUDSON 1,786,207
MACHINE GUN
Filed Dec. 12, 1927 5 Sheets-Sheet 4

Inventor
Robert F. Hudson
By
Attorney

Dec. 23, 1930.   R. F. HUDSON   1,786,207
MACHINE GUN
Filed Dec. 12, 1927   5 Sheets-Sheet 5

Inventor
Robert F. Hudson
By Daniel Belter Moore
Attorney

Patented Dec. 23, 1930

1,786,207

UNITED STATES PATENT OFFICE

ROBERT F. HUDSON, OF RICHMOND, VIRGINIA, ASSIGNOR, BY MESNE ASSIGNMENTS, TO AUTOMATIC GUNS, INC., A CORPORATION OF DELAWARE

MACHINE GUN

Application filed December 12, 1927. Serial No. 239,437.

This invention relates to improvements in machine guns, one object of the invention being the provision of a machine gun in which the gases of explosion act to reduce the recoil, particularly after the initial movement of the projectile within the barrel, there being provided novel mechanism by means of which the forward action of the gases are utilized to produce this effect, the particular structure of this application being the outcome of experimentation and perfecting of the structure as shown and described in my co-pending application filed February 28th, 1923, Serial No. 621,824.

Another object of this invention is the provision of a power-storing device adapted to be actuated by the gases of explosion, so that the cartridge is exploded and remains within the breech of the barrel for a predetermined period before the operation of the power storage device takes place, the power storage device then operating means for reciprocating the breech block and during such reciprocation to eject the spent shell, reload a new cartridge, and set and release the firing pin.

Another object of this invention is the provision of a motor operated synchronized machine gun that is positively controlled so as to prevent the opening of the breech in case of a misfire or hangfire.

Another object of this invention is the provision of a machine gun so designed that in the event of a hangfire or misfire the gun is automatically halted, the firing can only be resumed by removing the hangfire shell or mutilated shell, and the introduction of a new cartridge, thus providing a gun that does not permit the placing of a new cartridge in firing position while the mutilated or hangfire shell is still in the chamber.

Another object of this invention is the provision of means whereby should a spent shell remain in the breech of the barrel or a cartridge fail to explode, the gun will cease firing and cannot be operated again until the cartridge or damaged shell is removed from the breech of the barrel.

Another object of this invention is the provision in a gun of this type especially adapted for use in small to large calibers, the range so far having been undetermined, but with possibilities from thirty caliber, the shell used in small arms, up to seventy five (75) millimeters, and the mechanism being so arranged and constructed as to be operated as a single shot, or any number of repeating shots, and to be operated manually, automatically or through the instrumentality of a machine such as the motor of an airplane, the same being so constructed as to be readily synchronized with the propeller and operated directly from the shaft of the engine.

Another object of the present invention is to so house the movable parts at the breech of the gun so as to protect them from flying sand and the like.

With the foregoing and other objects in view, the invention resides in a novel arrangement of machine gun in which the gases of explosion are used merely as a setting means while spring-actuated means are employed as the real operating mechanism for the gun, thus providing in a gun of this type a stationary barrel gun with the least possible recoil and one in which the rapidity of fire may be regulated as, for instance, from a single shot per minute up to one thousand shots per minute.

In the accompanying drawings:—

Referring to the drawings, the numeral 20 designates the receiver portion of the gun to which is attached, in any desirable manner, the fixed barrel 21, which, as shown, is provided with the breech 21' for the reception of the cartridge C. The barrel, as here shown, threadedly engages the receiver at 22 and is jacketed at the connecting portion with the receiver with a jacket 23 which forms a continuation of the rear jacket 24 which houses the receiver and breech block mechanism, so that the same cannot be interfered with by dust, sand or other foreign substances. The side walls 25 of the receiver have removably connected thereto the lower section 26 of the casing, which, in turn, is secured in any desirable manner, but in such a way as to be readily removed so as to render the parts accessible.

Figure 5:
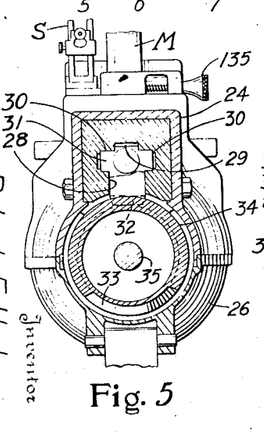
Figure 5 is a section taken on the line 5—5 of Figure 1.
Figure 6:
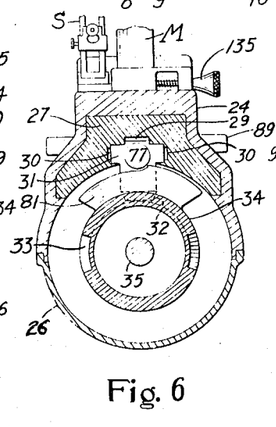
Figure 6 is a section taken on the line 6—6 of Figure 1.
Figure 7:
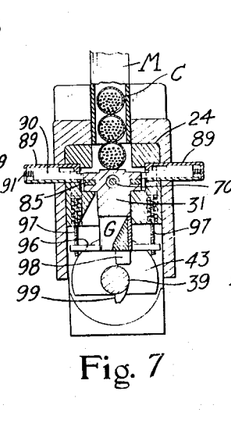
Figure 7 is a section taken on the line 7—7 of Figure 1.
Figures 8, 9:
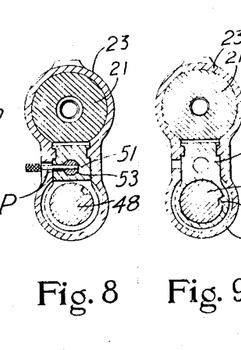
Figure 8 is a section taken on the line 8—8 of Figure 1.
Figure 9 is a section taken on the line 9—9 of Figure 1.
Figure 10:
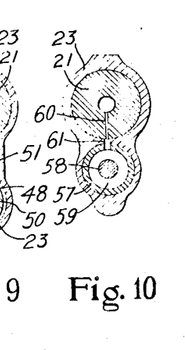
Figure 10 is a section taken on the line 10—10 of Figure 1.
Figure 11:
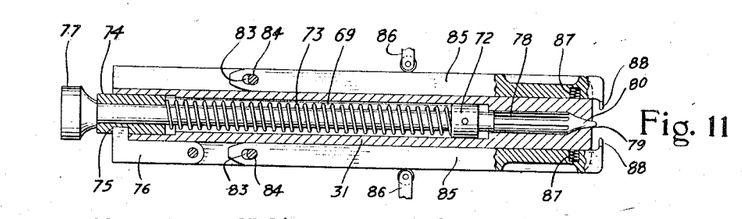
Figure 11 is a horizontal section through the breach block showing the firing pin in forward position.
Figures 12, 13:
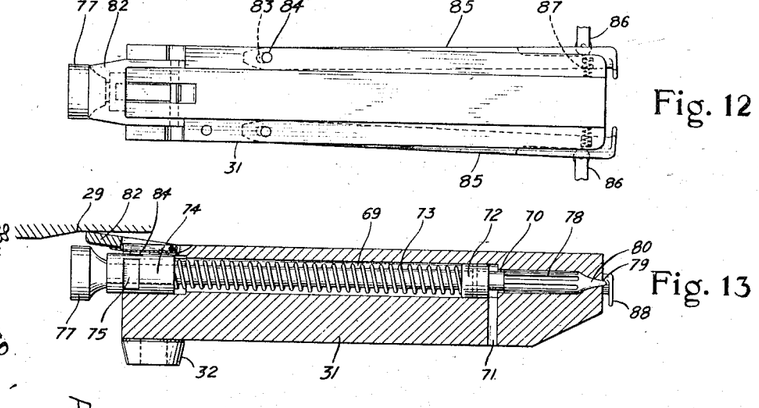
Figure 12 is a top plan view of the breech block showing the firing pin in slightly retracted position.
Figure 13 is a longitudinal sectional view taken vertically through the breech block showing the firing pin in the position it assumes just after having struck the fulminating cap with the cartridge.
Figure 14:
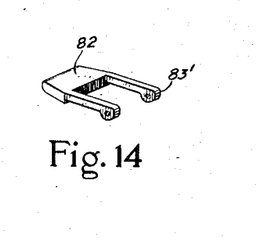
Figure 14 is a perspective view of the firing pin locking device.

Mounted within the receiver casing is the receiver block 27 which, as shown in Figures 5 and 6, is provided with a bore having the lateral portions 28, 29 and 30 for the reception of the breech block 31. This breech block, the detail construction of which is shown in Figures 11, 12 and 13, will be described in detail later on, but is mounted for reciprocatory movement within the receiver and is guided in a straight-line movement from the breech of the barrel to and from the rear of the receiver, the same being provided with an anti-frictional pin 32 which rides in the cam groove 33 of the rotary cam or drum 34, which, in turn, is supported within the receiver anti-frictionally upon a bearing B at one end where the shaft 35 extends rearwardly and is here shown as provided with a pawl and ratchet 36 and 37 operable by means of the handle 38, which may be taken as indicative of any mechanism by means of which the cam drum 34 may be rotated, as, for instance, the shaft of an airplane engine.

Figures 19, 20, 23, 24, 25, 26:
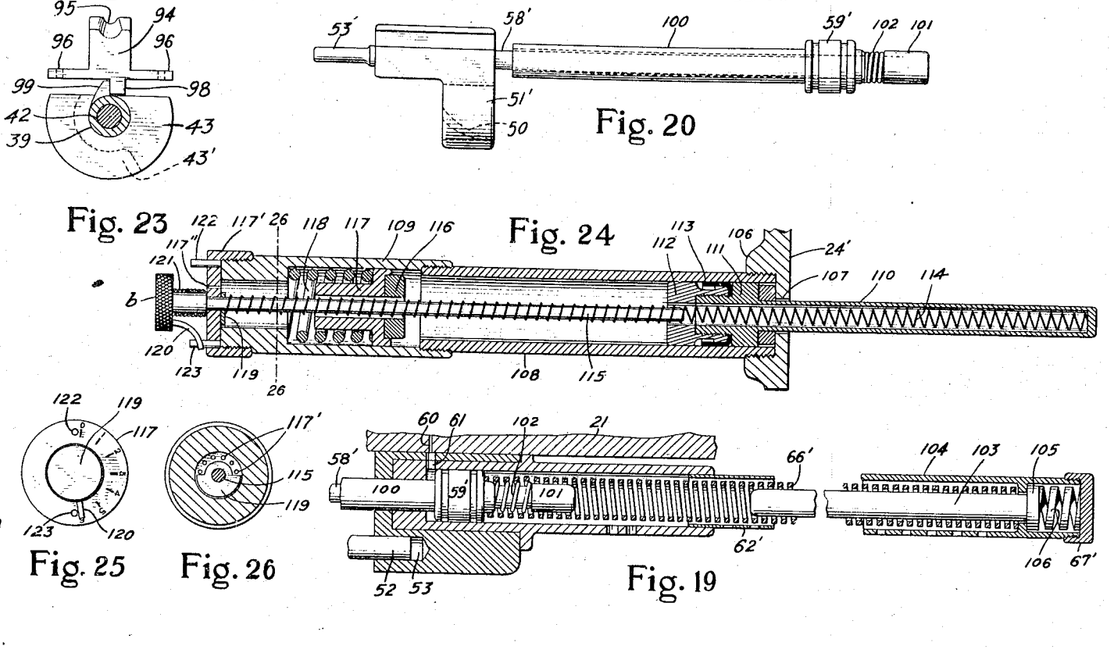
Figure 19 is a sectional view showing the forward end of the spring-carrying barrel with the modified form of a gas-actuated plunger.
Figure 20 is a view in elevation of the modified form of gas-actuated plunger and the movable member of the ratchet carried and controlled thereby.
Figure 23 is a view illustrating the same and the cartridge guide itself.
Figure 24 is a longitudinal sectional view through the means for regulating the speed of fire.
Figure 25 is a rear end view thereof showing the mechanism for operating the same at will.
Figure 26 is a section on the line 26—26 of Figure 24.
Figure 21:
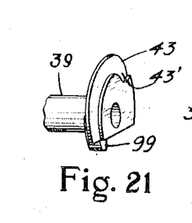
Figures 21 and 22 are perspective and plan views of the locking device and the cartridge guide actuating means.
Figure 22:
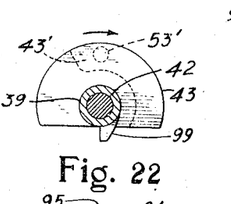

The forward shaft 39 of the drum 34 is provided with a recess 40 and a diametrically disposed pin 41 which receives the bifurcated end of the shaft 42, which shaft, in turn, is mounted at its forward end in the ball-bearing B' and carries the mutilated disk 43 which is shown in detail in Figures 21, 22 and 23, the same being provided with a groove 43', the shoulder portion of which is adapted to form one member of the lock to prevent the rotation of the drum, as will presently appear. Upon the forward end of the shaft 42 is provided one member 44 of a clutch 45, said clutch 45 being carried cooperatively by the members 44 and 48, the member 48, as shown, being provided with a spiral ratchet groove 49 which, in turn, receives the lug 50 of the operating frame or member 51. This member 48 is provided with a pin 47 which fits within a recessed end of the forward clutch member 44 while its forward shaft 52 is mounted for slight sliding and rotary movement in the opening 53 of the sleeve 54 which is pinned to the barrel by means of a wedge pin 55, as clearly shown in Figure 4ᵃ.

The ratchet operated frame 51 is connected to a shaft 58 and this shaft is mounted for sliding movement within the cylinder 57, which, in turn, is secured and carried by the sleeve 54 and receives for reciprocation the gas-actuated piston 59, the forward end of the member 51 being provided with the spring propelled locking means or pin 53 which is adapted to project through the opening 54 and engage the mutilated disk 43 which, at the proper time, in case of a mis-fire, will engage the recess 43' and thus lock the drum 34 against rotation. This will also take place should the last shell be exploded and be withdrawn from the barrel.

In order that gas may be admitted to the cylinder 57 at the rear of the piston 59, there is a small port 60 formed in the barrel and leading into the bore thereof, while the port 61 of the cylinder 57 is aligned therewith. Extending forwardly of the cylinder 57 and seated therewithin is the spring-encasing barrel 62 which is supported at its forward end in the sleeve or strap 63 pinned, as at 64, to the barrel and provided with the outer sleeve 65 at the forward end for encasing the power-storing device or spring 66, by means of which, as will presently appear, and by this means only, the cam drum 34 is rotated, the ends of the barrel 62 and the sleeve 65 being closed by the cap 67 provided with the exhaust aperture 68.

Figure 1:
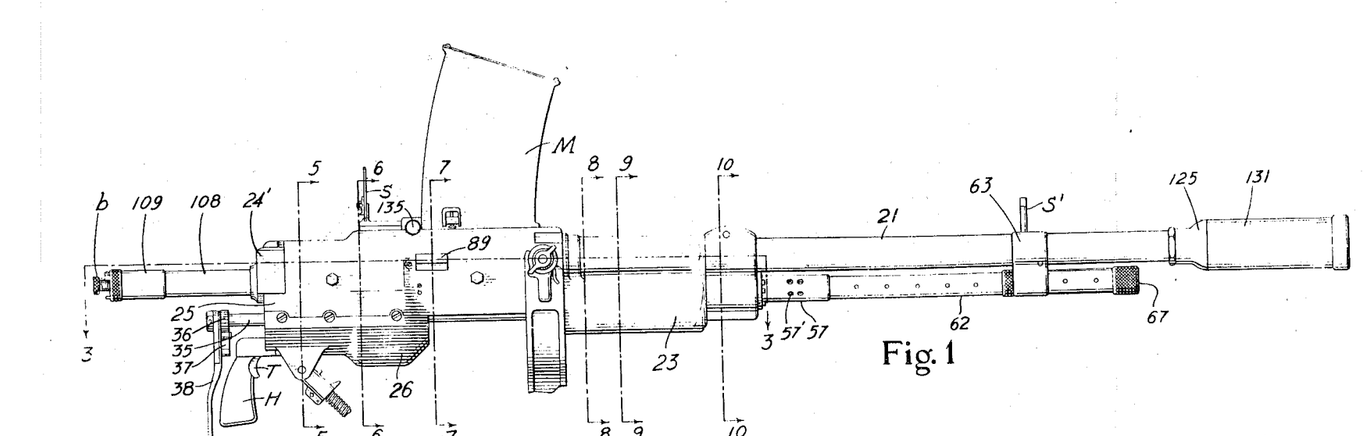
Figure 1 is a side elevation of the complete gun less the mounting or tripod.
Figure 2:
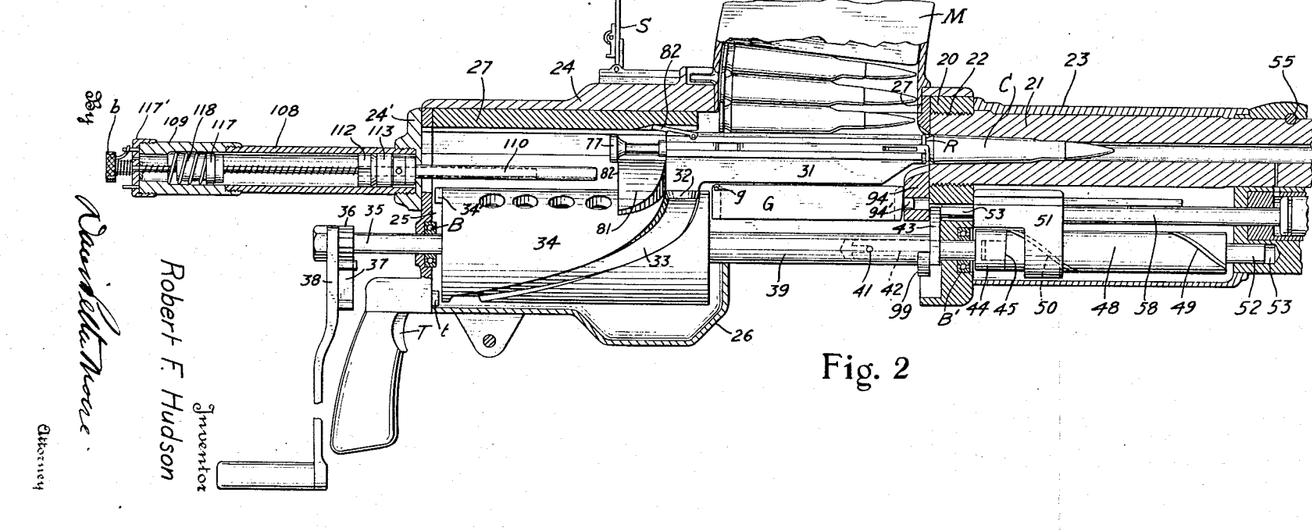
Figure 2 is a longitudinal sectional view of the rear portion of the gun with the parts in the position they assume with the cartridge in the barrel and the firing pin retracted ready to be released.
Figure 3:
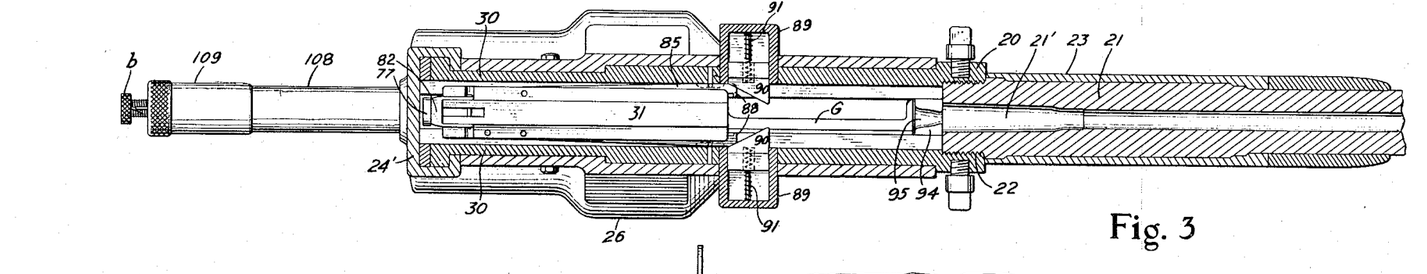
Figure 3 is a section taken on the line 3—3 of Figure 1 with the firing pin in its rearward position.
Figures 4, 4A:
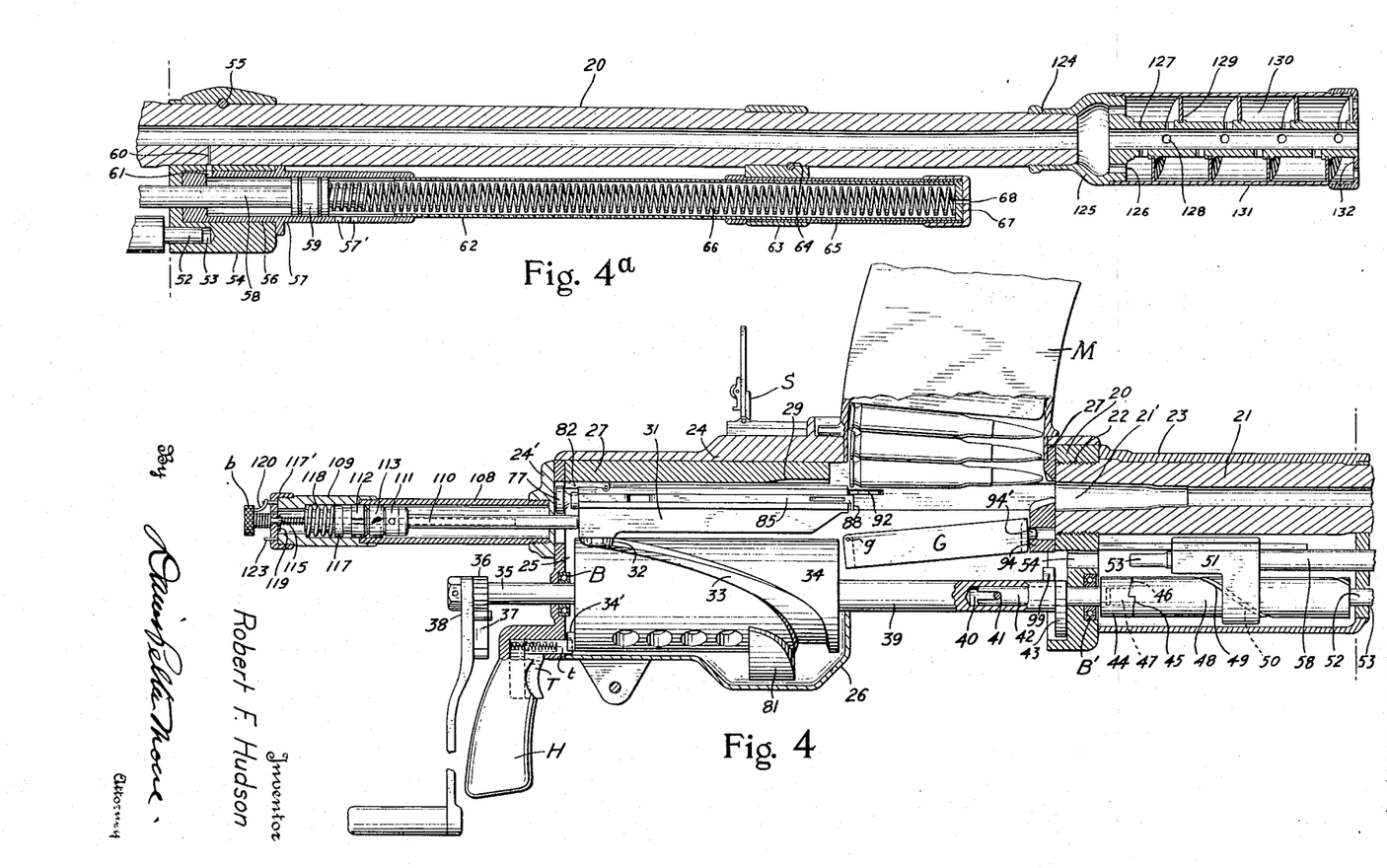
Figures 4 and 4ª are to be taken as a single figure and illustrate the gun in longitudinal section with the parts in the position they assume at a midway operating position from the spring, that is, after the gas-actuated piston has started to return due to the action of the spring and showing the breach block in the position as shown in Figure 3.

From the foregoing description, it is evident that as the cartridge is exploded, gas will enter the ports 60 and 61 and thus move the piston 59 from the position as shown in Figure 2 forwardly to a position slightly beyond that shown in Figure 4ª, compressing the spring 66. This takes place during the time that the cartridge has been exploded and the bullet has left the muzzle, but the shell or case is still within the breech of the barrel. The spring 66 after being fully compressed is then free to through the rotary ratchet driver to rotate the drum 34 and thus reciprocate the breech block 31.

As clearly shown in Figures 11, 12 and 13, the breech block consists of a member 31 provided with a bore 69 therethrough which is slightly reduced at its forward end and open at 79 for the projection of the fulminating cap-engaging end 80 of the firing pin 7, it being provided intermediate its ends with the fixed guide sleeve 72 which receives the forward end of the spring mounted upon the firing pin and which itself at the opposite end bears against the sleeve 74 which is provided with a recess 75 to receive the pivoted lock 76 and thus hold the firing pin removably within the bore, so that the same may be removed at will for adjustment, repair and replacement. The head 77 is provided to, as will presently appear, engage the cam projection 81 of the drum 34, a rear edge 32 engaging the head 72 and retracting it, as shown in Figure 2, to be released at a slight movement of the drum so as to explode the cartridge.

In order to prevent a back-firing from injuring the firing pin, the forward end thereof is grooved, as at 78, so that gases may escape through the opening 80 and the outlet 71 without injuring the parts.

Figure 15:
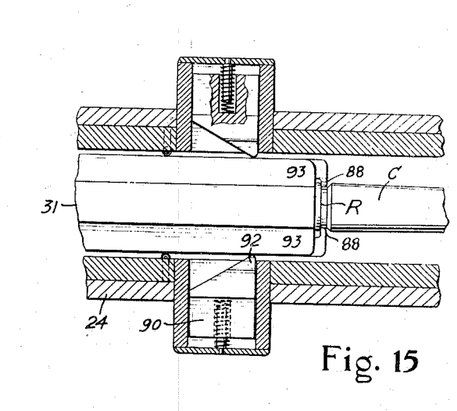
Figure 15 is a horizontal sectional view through the receiver showing the spent cartridge throwing means in a retracted position.
Figure 16:
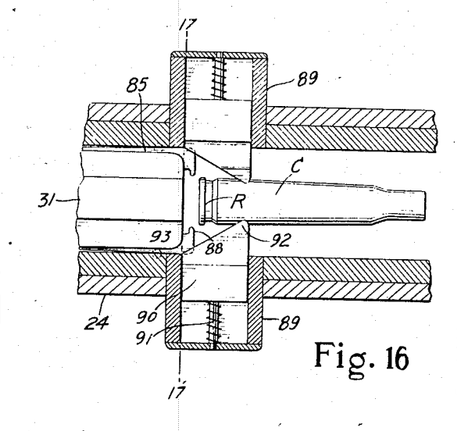
Figure 16 is a similar view showing them in retracted position engaging the spent shell to insure the expelling of the same from the receiver.

The cartridge ejector consists of two members 85 which are loosely mounted for slight outward and forward movement upon the pin and slot arrangement 83 and 84 within side grooves formed in the breech block, the same being normally held inwardly by means of the resilient anti-frictional release 86 against the tension of the small springs 87, so that the rim-engaging ends 88 may be properly disposed and operated from the position as shown in Figure 11, where they are in rim-engaging position, to the position as shown in Figures 12 and 16, where they are shown in rim-releasing position. These members 85 are guided by the walls, and, as before stated, the anti-frictional members 86 of the receiver, and are normally tensioned outwardly, so that the same are held inwardly to grip the shell or be in a position to engage the same, as shown in Figures 11 and 15, there, however, being, when the shell is seated within the breech block, a slight play between the ends 88 and the rim R of the cartridge, so that upon the initial recession or retractive movement of the breech block, a slight tap is given the rim of the cartridge to release the same before the initial strain is thrown upon the rim to withdraw the same from the barrel, this being done due to the fact that in many cases the explosive action fractures the shell, and if a too-sudden grip is taken with the rearward movement of the breech block, the rim leaves the shell within the barrel and thus renders it necessary to cease firing and remove the same. This also gives a delayed extraction—to allow pressure to lower and release casing walls of empty shell.

Figure 17:
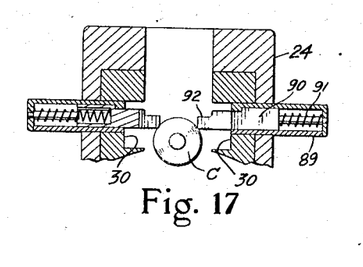
Figure 17 is a section taken on the line 17—17 of Figure 16.

In order to provide a means to insure the ejection of the shell from the receiver, a device, as clearly shown in Figures 15, 16 and 17, is employed. This consists of two small casings 89 connected upon opposite sides of the receiver and having mounted therein the angular-shaped plungers 90 which are spring-propelled and are acted upon by means of the breech block to retract the same within the casings upon the forward movement of the breech block, but are propelled by the members 91 outwardly so as to assume the position shown in Figures 16 and 17 where the end 92 thereof engages the spent shell C above the center line and adjacent the rim thereof simultaneously with the release of the rim-engaging portions 88 of the cartridge extractor, thus causing the shell to be released and thrown down through the lower open portion of the receiver with the mechanism in the position to receive the next cartridge for delivery to the breech of the barrel.

There is also provided a means for locking the firing pin with the fulminating cap-engaging end 79 within the breech block, as shown in Figure 12, this being accomplished by means of the pivoted locking member 82 whose terminals 83 are pivotally connected to and bodily carried by the breech block to cooperate with the upper wall 29 of the receiver, which acts in opposition to the spring 84 to press the pivoted member 82 downwardly and through its peculiar cam action against the end 77 to move the firing pin slightly to the rear so that the end 79 is retracted within the block and, therefore, is in no danger of prematurely exploding a fulminating cap, and renders it possible to make the firing pin in a single element instead of in two sections, as is the usual practice.

In order to provide a means whereby the forward end of the cartridge is properly guided within the breech of the barrel, and also to lock the mechanism in case the shell is not extracted due to the rim being torn off and the like, the guide 94 having the bullet receptacle 95 and with the lateral wings 96 is mounted at the rear of the breech of the barrel within the receiver upon the guide rods 97, being forced upwardly by springs mounted on the rods 97. The guide 94 is moved downwardly by the breech block when the block is moved forwardly and lowers the shell guide and lever G, which is pivoted at g and has its pin 94' engaging the guide 94. Thus, when the spent shell or hangfire cartridge is still in the barrel, the guide is locked by the same so that the locking lug 98 is in the path to engage the cooperating locking lug 99 carried by the shaft 39, and thus bolt the mechanism. It is now necessary that the spent or mutilated shell be manually removed, and inasmuch as the lugs 98 and 99 are timed to engage about one-eighth of a revolution ahead of the lug 34' being engaged by the lock t of the trigger T, it is evident that the spring 66 when lugs 98 and 99 are released and the shell extracted or removed will rotate the shaft 39 one-eighth of a revolution before it is bolted, thus setting the gun for the next shot as the fired shot is now in a position to be automatically moved forward for its seated position, as illustrated in Fig. 4 to the position as shown in Fig. 2.

Figure 18:
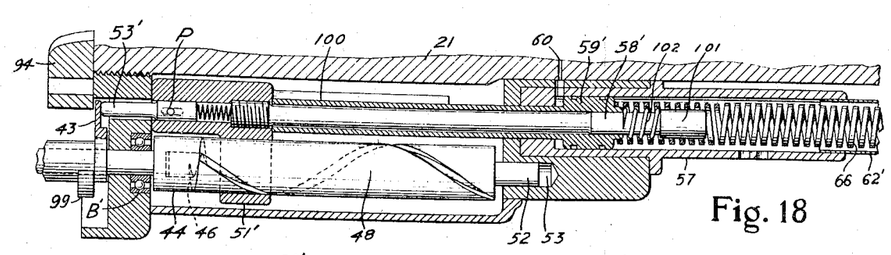
Figure 18 is an enlarged sectional view showing the ratchet mechanism for operating the breech block operating mechanism and a modified form of gas-actuated plunger.

As shown in Figures 18, 19 and 20, the piston 59' is provided with a guide sleeve 100 slidably mounted upon the ratchet carrying rod 58' which, at the forward end, is provided with the fixed stop and buffer end 101, a spring 102 being mounted upon the rod 58' and interposed between the member 101 and the plunger 59'. This is provided to take the initial impact from the gas entering the cylinder 57' and so as not to throw too great strain upon the rod 58' and tend to fracture the metal at its junction with the ratchet operating member 51'.

Mounted in the forward end of the barrel 62' carrying the springs 66 is a main buffer rod 103 whose forward end is guided in the apertured portion 104 and provided with a head 105, which, in turn, is held rearwardly by means of the extra heavy spring 106, the purpose of this being that when the plunger 59 has been thrown forward and carries with it the rod 58', the buffer end 101 is brought into contact with the inner end of the main buffer rod 103 and the spring 106 cushions the final end of this blow and slightly assists in the return of the same in conjunction with the springs 66'. This is an alternative construction to that shown and described in the other drawings.

Mounted in the removable end 24' of the receiver, which, by the way, is so disposed as to be readily slid vertically into and out of breech-sealing position, is the casing 108 which is what I term the speed-regulating device of the present gun, the same being made of two members, the rear member of which 109 is provided with a bore, while the member 108 is also provided with a bore that is concentric therewith. The buffer member 110 projects through the opening 107 of the receiver and into the receiver in the direct path of the center line of the breech block or bolt and below the firing pin, as particularly illustrated in Figures 2 and 4, the position in Figure 2 being that when the member 110 is extended to its full inward limit, while that shown in Figure 4 shows it retracted to its full limit.

There is mounted for sliding movement with the member 110 within the cylinder 108 a plunger which consists of the three members 111, 112 and 113 connected together so as to provide the necessary air-tight connection when the plunger is moved rearwardly due to the retractive action of the breech block when the same is moved rearwardly by means of the drum 34 through the action of the spring 66 only. A light spring 14 is mounted within the buffer member 110 and surrounds the pin 115 which, in turn, is mounted for slight rotary movement within the rear cap 117 of the present device, there being mounted within the member 109 for slight sliding movement the buffer which consists of the fiber disk 116 mounted and carried by the plunger 117 and the cushioning spring 118. Thus, when the plunger of this device is moved rearwardly by means of the buffer rod 110 when engaged by the breech block under spring action, the rear end thereof will engage the buffer disk 116 and the spring 118 will take up the final pressure imposed thereon and will give a forward impulse to the breech block after being compressed and upon movement the return of the breech block through its spring actuated means.

The cap 117', as shown, is provided with a plurality of openings 117″ which, in turn, are controlled by means of the valve 119 mounted upon the rod 115 and through the instrumentality of the burred or milled button $b$ may be moved to uncover any number of said openings according to the graduated scale shown at the rear of the cap 117′, as shown in Figure 25, the indicating arm or stop 120 being carried by the button $b$ and limited in its movements from zero to the last graduation by means of the respective pins 122 and 123.

By this means it will be seen that the gunner at will can manipulate the button $b$ and thus regulate the escape of air from the rear of the two plungers within the fire-regulating device so as to increase the rapidity of fire or decrease it, the greater the opening the more rapid the closing of all the openings cutting down the speed of fire to a minimum.

A trigger T with the spring actuated member $t$ is carried at the rear lower portion of the receiver, as shown in Figure 4, and is disposed to engage the lug 34′ carried by the drum 34 to lock the drum against rotation when the parts assume the position as shown in Figure 4 with the breech block retracted to its extreme rearward position with the spent cartridge expelled and with the new cartridge about to be fed. Thus the spring 66 is still in a position to operate the drum 34, it being little more than one-half compressed so that the actuation of the trigger T to release its member $t$ from the lug 34 will permit the continued rotation of the drum 34, the feeding of the cartridge within the barrel and the explosion thereof, the same when released locking the drum 34 against further rotation when the complete cycle from the position and to the position of Figure 4 has been performed.

It will be noted in this gun that the plunger 59, 59′ is always moved forward by gas action, thus pulling the same against the recoil inertia, so that the recoil of a gun of this type is greatly decreased and, in fact, it has been found in practice that a fifty-caliber gun of this model can be mounted upon a sixty-pound tripod, the usual type employed with the present thirty-caliber rapid fire gun, and that with this thirty-caliber mount the initial recoil amounts to practically nil, thus providing a gun of this type with practically no recoil or with so little recoil as not to interfere with the marksmanship or aiming of the gun.

In order, however, to assist further in lessening the recoil, to slightly deaden the noise due to the explosion, and at the same time cover the flame expelled from the muzzle of the gun, the device, as particularly illustrated in Figure 4ª, is connected, as at 124, to the forward end or muzzle of the barrel and consists of the base member 125 providing a base chamber and having cast integral therewith the perforated gas-admitting disk 126 and the projectile guiding tube 127. This guiding tube is provided with the perforations 128 for the escape of gas and the breaking up of the chain of flow of the same, while also attached to and carried by this sleeve 127 is the metal spiral 129, spaced at its edge from the casing 131 and extending the full length thereof, so as to provide a spiral gas-directing chamber 130 within the casing 131 which is connected to and carried by the support 125, there being attached to the forward end of the casing 131 and also to the forward end of the tube 127 the perforated cap 132. Thus the gases of explosion after being discharged from the muzzle of the barrel and entering the chamber of the member 125 have two avenues of escape, one directly through the tube 127 which acts as a projectile guide and through the openings in the plate 126 into the spiral chamber where the gases are given a retarded muffled action before the escape through the forward disk 132 and through the ports 128 into the tube 127, or vice versa.

By this means, the construction or arrangement of the spiral reduces the recoil action in the gun and has a tendency in practice to pull the gun forwardly, the tube being so constructed as to not in any way interfere with the marksmanship, either as to obliterating the sight or the occurrence of gas, as is the case where the spiral is carried by the casing 131 and no sleeve as 127 is provided.

The spaces between the outer edges of the blades of the spiral and the casing 131 prevent the accumulation of dirt or carbon and also assist in the dissipating and braking gas action.

The usual sights S and S′ are provided upon a gun of this type and are adjustable at will.

This gun is also constructed to use either the vertical cartridge feeding magazine M detachably connected in place by means of the spring-propelled pin 133 or a belt-feed may be provided. By means of the pin P the ratchet-actuating member 51 and its shaft 53 may be manually retracted against the spring at the initial setting of the gun.

The peculiar formation of the cartridge extractor 85 as before stated permits slight movement of its rim-engaging fingers 88 to play in the rim groove to give a slight tap on the rim at the initial extraction, but this is not all, as it has been found in practice that it also permits a delayed extraction of the shell or case, thus allowing the pressure of the exploding gases to lower and release the impinging of the walls of the shell against the breech of the barrel, making it much easier to extract and reducing the possibility of a mutilated shell, as is the case when the shell is extracted too soon or while under pressure in the breech.

It will also be noted that the locking mechanism consisting of the pin 53 and the disk 43 is brought into play, due to a miss or hangfire, while the locking device 98—99 is brought into action due to retention of a shell or case in the breech, thus providing two automatic locks that bolt the mechanism so that it is impossible for a cartridge to be fed or inserted in the breech of the barrel, until the evil is corrected by the manual removal of the cause. This is particularly desirable when the supersensitive nose fuse cartridges are being used, for if the gun is not immediately bolted, the next cartridge is forced into or against the obstruction and damage to the gun results.

In the automatic halting of the mechanism for any one of these causes and by either locking mechanism, fire can be resumed only by releasing either the lock 53 or 98, the removal of the obstruction permitting the drum 34 to rotate until halted in either event by the lug 34' and trigger lock t.

From the foregoing description, taken in connection with the drawings, it is evident that with a gun of this type the gases of explosion are used only to operate the power-storing device whose plunger, acting forwardly, reduces the recoil action of the gun so as to make this gun an ideal gun for all purposes and for airplane work particularly, while with the addition of the device connected to the muzzle thereof, the recoil, after the projectile has been started in flight, is reduced to a minimum, so that a very accurate non-recoil firearm of this type is produced.

By the peculiar mechanism, the present construction of machine gun is adapted to all calibers from the smallest type hand-gun to fairly large type cannon, while with the gas driven piston the muzzle brake, regardless as to whether the piston compressed spring is employed to actuate the breech block for automatic operation, a non-recoil mechanism for larger calibre guns and cannons is herein shown and described, it being practical to use this mechanism with slight modification upon 1 inch to 16 inch guns, thus reducing the cost of mount manufacture, increasing the accuracy and speed of fire, and increasing the life of the guns.

What I claim as new is:—

1. A machine gun, including a receiver, a barrel, a breech block reciprocatingly mounted in the receiver, means for actuating the breech block, power-storing means for operating the actuating means, means actuated by the gases of explosion for setting the power-storing means, and a muzzle brake attached to the end of barrel and acted upon by the emitting gases of explosion, whereby the combined action of the gases of explosion act upon the actuated means and the brake to reduce the recoil of the gun.

2. A machine gun, including a barrel, a receiver, a breech block reciprocatingly mounted in the receiver, a spring projected firing pin mounted in the breech block, means for reciprocating the breech block, and cooperative means carried by the firing pin and the breech block and operated by the receiver for slightly retracting the firing pin to encase its cap engaging end during the reciprocation of the breech block.

3. A machine gun according to claim 1, characterized by the fact that there is external means for continuously operating the breech block actuating means independently of or in conjunction with the power storing device.

4. A machine gun, including a barrel having a breech, a tube disposed parallel therewith and in communication with the bore of the barrel at a point approximately the length of a cartridge beyond the cartridge chamber of the barrel, a spring returned plunger mounted in the tube and operated in a forward direction by the gases of explosion entering said tube, and a braking device at the muzzle of the barrel and upon which the gases of explosion act upon in cooperation with the piston to produce a counter recoil action to the gun.

5. A machine gun according to claim 4, in which a buffer for the piston is mounted at the outer end of the tube.

6. A machine gun according to claim 4, in which a spring buffer for the piston is provided.

7. A machine gun, including a barrel having a cartridge chamber and a port leading from the barrel at a point slightly beyond the inner end of the cartridge chamber, a tube parallel with the barrel and in communication therewith through said port, a spring buffeted piston mounted in said tube to be moved forwardly by the gases of explosion, and recoil subduing means located at the muzzle of the barrel for utilizing the velocity of the gases of explosion after leaving the muzzle of the barrel.

8. A machine gun according to claim 7, in which an additional buffer for the piston is provided.

9. A machine gun according to claim 7, in which an additional spring buffer for the piston is provided.

10. A machine gun, including a receiver, a barrel connected thereto, a tube parallel with the barrel and in communication with the bore of the barrel, a guide rod mounted in the tube, a sleeve carrying a piston mounted upon said rod and slidably mounted in the tube, a spring acted upon by the piston to be compressed when the piston is moved in a forward direction by the gases of explosion, and a spring buffer in line with to reduce the jar of the guide rod and piston when propelled by the gases of explosion.

11. A machine gun according to claim 10, in which a muzzle brake is applied to the end of the muzzle of the barrel to be acted upon by the gases of explosion also.

12. A machine gun, including a receiver, a barrel connected thereto, a breech block mounted in the receiver, a cartridge extracting mechanism carried by the breech block, and two oppositely disposed members mounted in the receiver and in the path of the breech block for engaging a spent shell to remove the same from the extracting mechanism.

13. A machine gun according to claim 12, in which said members are spring projected and are retracted by the breech block during the time that the receiver is closed or partially closed by the breech block.

In testimony whereof I have hereunto set my hand.

ROBERT F. HUDSON.